United States Patent
Ledoux et al.

(10) Patent No.: US 12,385,880 B2
(45) Date of Patent: Aug. 12, 2025

(54) METHOD FOR DETECTING ROAD AND TIRE CONDITIONS

(71) Applicant: COMPAGNIE GENERALE DES ETABLISSEMENTS MICHELIN, Clermont-Ferrand (FR)

(72) Inventors: Thomas Ledoux, Clermont-Ferrand (FR); Benoit Gandar, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1078 days.

(21) Appl. No.: 16/631,895

(22) PCT Filed: Jul. 11, 2018

(86) PCT No.: PCT/FR2018/051742
§ 371 (c)(1),
(2) Date: Jan. 17, 2020

(87) PCT Pub. No.: WO2019/016445
PCT Pub. Date: Jan. 24, 2019

(65) Prior Publication Data
US 2020/0158692 A1 May 21, 2020

(30) Foreign Application Priority Data
Jul. 17, 2017 (FR) ...................... 17/56752

(51) Int. Cl.
*G01N 29/00* (2006.01)
*G01N 29/14* (2006.01)
(Continued)

(52) U.S. Cl.
CPC ............. *G01N 29/14* (2013.01); *G01N 29/46* (2013.01); *G07C 5/0808* (2013.01); *G01N 2291/263* (2013.01); *G01N 2291/2692* (2013.01)

(58) Field of Classification Search
CPC .. G01N 29/14; G01N 29/46; G01N 2291/263; G01N 2291/2692;
(Continued)

(56) References Cited

U.S. PATENT DOCUMENTS 5,436,612 A * 7/1995 Aduddell ................. B60Q 1/52
340/446
10,365,248 B2 7/2019 Paturle et al.
(Continued)

FOREIGN PATENT DOCUMENTS

| CN | 106919173 A | 7/2017 |
|---|---|---|
| JP | 2010-188885 A | 9/2010 |

(Continued)

OTHER PUBLICATIONS

International Search Report dated Aug. 23, 2018, in corresponding PCT/FR2018/051742 (4 pages).

*Primary Examiner* — Peter D Nolan
*Assistant Examiner* — Peter Y Ning
(74) *Attorney, Agent, or Firm* — VENABLE LLP

(57) ABSTRACT

A method for determining a running parameter of a vehicle travelling on a road, based on a measurement of a sound signal produced by a tire of the vehicle, and on measurements and estimations of running conditions effected in real time.

16 Claims, 4 Drawing Sheets

(51) Int. Cl.
*G01N 29/46* (2006.01)
*G07C 5/08* (2006.01)

(58) Field of Classification Search
CPC .............. G07C 5/0808; B60C 11/243; B60C 2019/004; B60C 11/246
See application file for complete search history.

(56) References Cited

U.S. PATENT DOCUMENTS

| | | | |
|---|---|---|---|
| 10,639,945 B2 | 5/2020 | Ledoux et al. | |
| 2004/0212516 A1* | 10/2004 | Bhagavathula | G01N 29/46 340/901 |
| 2005/0076987 A1* | 4/2005 | O'Brien | B60C 23/06 152/415 |
| 2008/0018441 A1* | 1/2008 | Orrell | B60C 23/06 340/442 |
| 2009/0271061 A1* | 10/2009 | Wang | G01M 17/06 701/29.5 |
| 2011/0200199 A1* | 8/2011 | Wakao | G01H 17/00 381/56 |
| 2011/0252862 A1* | 10/2011 | Paturle | B60C 11/24 73/8 |
| 2011/0264300 A1* | 10/2011 | Tuononen | G01M 17/02 701/1 |
| 2013/0116972 A1* | 5/2013 | Hanatsuka | B60W 40/06 702/167 |
| 2016/0349219 A1 | 12/2016 | Paturle et al. | |
| 2017/0176196 A1* | 6/2017 | Powers | G01C 21/3602 |
| 2019/0212138 A1* | 7/2019 | Hanatsuka | G01W 1/00 |
| 2020/0122521 A1 | 4/2020 | Ledoux et al. | |
| 2020/0126323 A1 | 4/2020 | Ledoux et al. | |
| 2020/0256672 A1* | 8/2020 | Sekizawa | G06N 20/10 |

FOREIGN PATENT DOCUMENTS

| | | | | |
|---|---|---|---|---|
| JP | 2012132873 | * | 12/2010 | |
| JP | 2012132873 A | * | 7/2012 | |
| WO | WO-2015092253 A1 | * | 6/2015 | ............ B60C 23/00 |

* cited by examiner

METHOD FOR DETECTING ROAD AND TIRE CONDITIONS

BACKGROUND

The invention relates to a method for detecting the condition of the road and of the tyre equipping a vehicle travelling on this road.

It is, in effect, of use to be aware at all times of the condition of the road or of the tyre for interaction with the driver or with driving assistance systems in such a manner as to inform them in real time of the evolution of running conditions and, more generally, the possible change in conditions of grip of the tyre and the road behaviour of the vehicle.

The purpose of these methods is thus to flag up the evolution of running conditions, such as the transition between conditions of running on dry, damp, wet or snowy ground. They are based on the observation that the noise frequency and intensity generated by the tyre vary when the condition of the road changes and analyse sound recordings made by microphones arranged close to the tyre and the road.

On the basis of the recording of a sound power frequency spectrum, the weather condition of the road is determined with the aid of judiciously chosen ratios or by comparing this spectrum with prerecorded data.

It is observed, however, that the accuracy and reliability of all these methods relies to a great extent on the introduction of supplementary parameters such as knowledge of the running speed, temperature or vehicle load, the degree of wear or the tread pattern type used and, in more complex methods, of the recording of the visual condition of the road located in front of the vehicle. It is thus necessary to combine information from a plurality of sensors, which cannot but have an impact on the cost of implementing the proposed devices.

An object of the invention is to provide a robust solution to the problem of determining a running parameter of a vehicle. Complementarily, the method proposed by the invention also makes it possible, unexpectedly, to determine, on the sole basis of a sound recording, parameters such as weather conditions, the type of road surface, the degree of wear of the tyre or the type of tread pattern used.

Sound recordings are made using a microphone judiciously placed on the vehicle. The sound power spectral density is distributed over a given frequency interval. This spectrum varies as a function of an array of modalities, such as weather conditions, the condition of the road, the degree of wear of the tyre, the type of tread pattern of the tyre and, to a lesser extent, the inflation pressure, load, etc. One of the primary modalities liable to modify this spectrum, all conditions otherwise remaining the same, is the speed of the vehicle at the moment when the measurement is made.

It has been found that this variation could be practically neutralized if, instead of considering the power spectrum arising from the measurement, this spectrum were recalculated while "normalizing" the data measured with the aid of the total sound power recorded during the measurement time over the whole of the frequency interval. This has the aim of eliminating the speed effect and rendering the measurement substantially unaffected by this modality.

Application WO2015/092253 discloses a method for determining the condition of a road or the condition of a tyre based on such an observation. However, it has been observed that this method was relatively computationally intensive and, furthermore, that it lacked accuracy and robustness. The object of the present invention is thus to remedy this drawback.

SUMMARY

The method for determining a running parameter of a vehicle travelling on a road according to the invention thus comprises the steps of:
  recording a measurement of a sound signal produced by the tyre travelling on a surface of the road during a given time interval,
  determining a spectral power density of the sound signal over a given frequency interval,
  segmenting the frequency interval into a plurality of frequency bands of previously determined widths and associating with each frequency band a data item representing a mean sound power measured in said frequency band, the representative data from a measurement forming variables of a vector associated with said measurement,
  determining a condition of the road and of the tyre corresponding to the vector associated with the measurement performed, using a method of identifying the data based on a learning basis formed by a set of vectors associated with measurements previously recorded and performed, in accordance with the same steps as above, under known running conditions as a function of modalities each representing a given condition of the road and of the tyre.
The method being characterized in that the identification method comprises the following steps:
  on the basis of the learning basis, determining a reduced discriminant space in which zones formed by each modality or combination of modalities are identified,
  on the basis of measurements and estimations of running conditions performed in real time, reducing the discriminant space to the zones corresponding to the measured and/or estimated running conditions.

In a preferred embodiment, the measurements and estimations relate to the following running conditions:
  a direct measurement by the vehicle and/or linked electronic systems of controlled running parameters included in the group comprising the speed of the vehicle, the pressure of a tyre and the load carried, and
  estimations of non-controlled running parameters included in the group comprising: the wear of the tyres, the condition of the road surface and weather conditions.

These measurements and estimations make it possible to limit the number of unknown running parameters and thus to use a rule of characterization or of prediction of conditions that is adapted to only unknown parameters. This allows the robustness and the quality of determination of an unknown running parameter to be improved.

Thus, if the running parameter that it is sought to determine is wear and if elements concerning the other parameters, such as the condition of the road surface and weather conditions, are available, knowledge of these elements makes it possible to reduce the determination possibilities arising from the identification method.

Non-controlled running parameters may be determined in different ways. Thus, according to the embodiments, the following means, described, here, in a non-limiting manner, may be envisaged:

For the estimation of weather conditions or the weather conditions of the road:
  The use of a stream of external weather information transmitted to the vehicle,
  The use of a temperature and/or moisture and/or atmospheric pressure sensor,
  The use of an optical device of camera type,
For the estimation of the condition of the road surface:
  The use of a database containing cartographic data on types of ground surface, and vehicle geolocation data,
  The use of a database containing data recorded in the vehicle, and containing geolocation-based data, which are possibly dated, determined by the vehicle in the course of a previous journey and reused at the time of a subsequent journey,
  Communication with vehicles in the immediate environment or any other communicating object that might be aware of this state of the road surface,
  A detection device onboard the vehicle, for example a laser-type device,
For the estimation of the wear of the tyre:
  Information from a database containing maintenance information for the vehicle and/or its tyres,
  A manual measurement performed previously,
  Communication with a system for measuring wear positioned on the ground,
  An evaluation arising from the evaluation of an equivalent running radius of the tyre,
  An extrapolation from earlier wear condition information.

In a preferred embodiment, the identification method is included in the group comprising: supervised or non-supervised learning algorithms, form recognition algorithms, "Support Vector Machine" algorithms, neural networks, "Deep learning" algorithms, "Kohonen mapping" algorithms, "k-nearest neighbours" algorithms, algorithms based on decision trees or decision-making rules, "Boosting" algorithms, Fisher discriminant analysis, Bayesian networks, canonical analysis, correspondence analysis or logistic regression.

In a preferred embodiment, the method is characterized in that the representative data forming the variables of a vector associated with a measurement are obtained by identifying the ratio between the mean sound power measured in a frequency band and the total sound power measured over the entire frequency interval. In another example, said data are obtained by identifying the ratio between the mean power and maximum power over the entire frequency interval. Generally speaking, they may be obtained by computing an indicator determined on the basis of characteristics of the signal.

The method according to the invention may also comprise the following features, in isolation or in combination:
  The total measured sound power is equal to the sum of the mean sound powers of all the frequency bands of the frequency interval in question.
  The frequency bands are determined by splitting the frequency interval into one-third octaves.
  The time frame of a measurement is less than or equal to 0.5 seconds and preferably less than or equal to 0.25 seconds.
  The frequency interval is between 0 Hz and 20 KHz.
  The frequency interval is between 200 Hz and 20 KHz.
  A "weather" class of modalities, formed by different weather conditions for the road, comprises a dry condition, a damp condition and a wet condition.
  A "road surface condition" class of modalities, formed by different road surface conditions for the road, comprises a closed condition, a medium condition and an open condition.
  A "wear" class of modalities, formed by different tyre wear conditions, comprises a new condition, a semi-worn condition and a worn condition.
  A "tread pattern" class of modalities, formed by different types of tyre tread pattern, comprises a tread pattern of summer type and a tread pattern of winter type.
  The data identification method makes provision for the steps of:
    transforming the vector associated with a measurement in said reduced discriminate space and, as a function of the location of said vector, associating with the measurement a probability according to each of the modalities or combinations of modalities,
    determining the most probable modality according to each of the modality classes.
  A modality in accordance with the "road surface condition", "wear" or "tread pattern" modality is associated with the measurement after having previously determined that the measurement was performed on a dry road.
  A probability according to each of the combinations of modalities containing this modality is associated with the measurement, and the modality of the class having the greatest probability is attributed to this measurement.
  A diagnosis of the condition of the tyre is performed in accordance with the "wear" modality or the "tread pattern" modality by combining the results of measurements performed at different time intervals.
  The sound signal generated by the tyre is measured using a microphone placed in the front part of a wheel arch located at the rear of the vehicle.

BRIEF DESCRIPTION OF THE FIGURES

The invention will be better understood upon reading the appended figures, which are provided by way of examples and do not have any limiting character, in which.

DETAILED DESCRIPTION OF THE INVENTION

Figure 1:
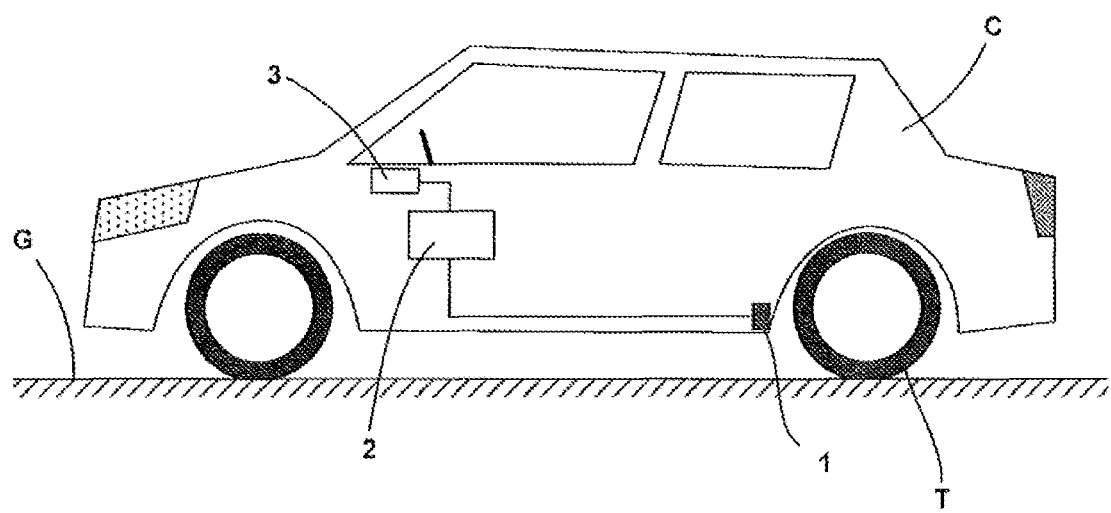
FIG. 1 shows a vehicle equipped with a device for measuring and analysing the sound power of a tyre.

The vehicle C travelling on a ground surface G, shown schematically in FIG. 1, comprises front and rear wheel arches in which the wheels equipped with tyres T are accommodated.

When the vehicle C moves, the tyre T generates a noise, the amplitude and the frequency of which are dependent on multiple factors. This sound pressure is in fact the overlaying of noises of various origins, such as the noises generated by contact between the tread blocks of the tread pattern and the ground surface G, by air movements between the tread pattern elements, by particles of water lifted up by the tyre, or by air flows linked to the speed of the vehicle. Listening to these noises is also superposed together with the noises of the vehicle that are linked to the environment, such as engine noise. All these noises are likewise dependent on the speed of the vehicle.

A listening means, such as a microphone 1, is installed in a wheel arch to listen to running noises, as close as possible to the location where the noises are generated. Obviously, use precautions are taken to protect the microphone from adverse external effects, such as splashes of water, mud or gravel. To that end, the microphone is preferably installed at the front of the wheel arch.

Ideally, the installation of a microphone in each wheel arch may be deemed to constitute the best way in which to capture all the running noises generated by the tyres. However, with a view to determining the condition of the road (weather condition and porosity of the road surface), a single microphone is sufficient. In this latter case, it is preferable to insulate the microphone from aerodynamic noises and engine noises.

One compromise seems to be to install the microphone at the front part of one of the wheel arches of the rear axle.

It is also possible to place the microphone in the rear bumper or in the front bumper.

The vehicle also comprises a computer 2 connected to the microphone and configured such as to execute the operations that make it possible to format and to analyse, as will be described below in detail, the raw information originating from the microphone and to estimate the condition of the ground surface or of the tyre as a function of a measurement of the sound power detected by the microphone.

Information storage means are associated with the computer. These means allow the storage in memory of the data relating to a learning plan involving the measurements performed under known running conditions and in accordance with the modalities describing the different conditions of the road or of the tyre, or a database containing geolocated, dated measurements, as described previously.

Lastly, information relating to the condition of the road or of the tyre may be transmitted to display means or to driving assistance systems 3, or on a remote server.

Here, "modality" is understood to mean a set of conditions linked to the condition of the ground surface or of the tyre that are capable of appreciably causing a variation in the measurement of sound pressure.

As has been stated, the number of parameters having a potential impact on the tyre noise may be significant. However, it appears that certain parameters have a weak or second-order influence on the nature of the noise generated by the tyre. This may be the case, for example, of the internal pressure of the tyre or the load on the tyre.

Surprisingly, it appears that the weather condition of the road seems to be a first-order parameter. Its impact on tyre noise is very significant and, above all, independent of all the other parameters, such as the condition of the surface of the road, the condition of wear of the tyre or the type of tread pattern of the tyre. These other parameters are also likely, to a lesser degree, to vary the running noise to the extent that the intrinsic acoustic signatures thereof can be discerned.

The weather condition of the road forms a first class of modalities, called the "weather" class, in which a plurality of conditions are differentiated, for example three conditions: in this case, a dry road is distinguished from a damp road, which is characterized by a depth of water flush with the natural roughness of the surface of the road, or from a wet road where the depth of water exceeds the level of the natural roughness of the surface of the road. Real-time knowledge of the evolution of the weather conditions of the road is of primary importance when adapting, for example, driving assistance systems.

In a second class of modalities, called the "condition of the road surface" class, different conditions of the surface of the road are likewise distinguished. A road surface is qualified as a closed surface when it has a smooth appearance without roughness such as, for example, a bitumen that has been squeezed after having been subjected to high levels of heat. A road surface will be deemed to be open when the roughness is significant, such as that of a worn road surface or that of a country road rapidly repaired using a surface coating produced by spraying pebbles onto bitumen. A medium road surface describes all road surfaces in an intermediate state between the above two states and qualifies, more particularly, new road surfaces. It is assumed, here, that the porosity of the road surface influences permeability or sound reflection of the noise generated by the tyre. Indeed, the phenomenon of pumping air trapped between the ground surface and the tread pattern of the tyre, and also the phenomenon of the amplification of the noise by the air wedge formed by the curvature of the tyre and the ground surface are all the more pronounced when the surface of the road is closed. Real-time knowledge of the condition of a road may prove to be useful if, for example, this information is returned by a high number of vehicles or a fleet of dedicated vehicles to a centralized road network monitoring and maintenance system.

As regards the condition of the tyre, it is possible to ascertain the condition of wear by distinguishing, in a third class of modalities, called the "wear" class, the new condition, the worn condition and an intermediate condition considered, here, to be the condition of a semi-worn tyre. Information about the evolution of the wear characteristic over time is also of paramount importance, particularly if it is coupled with information on the weather condition of the road. Indeed, it is known that a vehicle equipped with worn tyres that is travelling on a wet road surface is likely to more easily lose grip ("aquaplaning") than if it had new tyres.

Lastly, the method according to the invention is capable of discerning a fourth class of modalities, called the "tread pattern" class, relating to the type of tread pattern of the tyre, by distinguishing whether this is a summer-type tread pattern or a winter-type tread pattern. These two types of tyre are distinguished essentially by treads that have different tread patterns, highly notched and siped in the case of winter tread patterns, and more directional and less notched in the case of summer tread patterns, and also by the nature of the materials forming the tread, which is softer in the case of winter tyres and harder in the case of summer tyres. These characteristics are not without influence on the behaviour and road handling of the vehicle and may constitute useful information when adapting the driving system, in particular in regions where tyre changes alternate between summer periods and winter periods.

The method according to the invention makes it possible to highlight each of the modalities of these various classes in an isolated manner as is the case, more particularly, of the weather characteristic, or in a combined manner in the case of the other characteristics.

Figure 2:
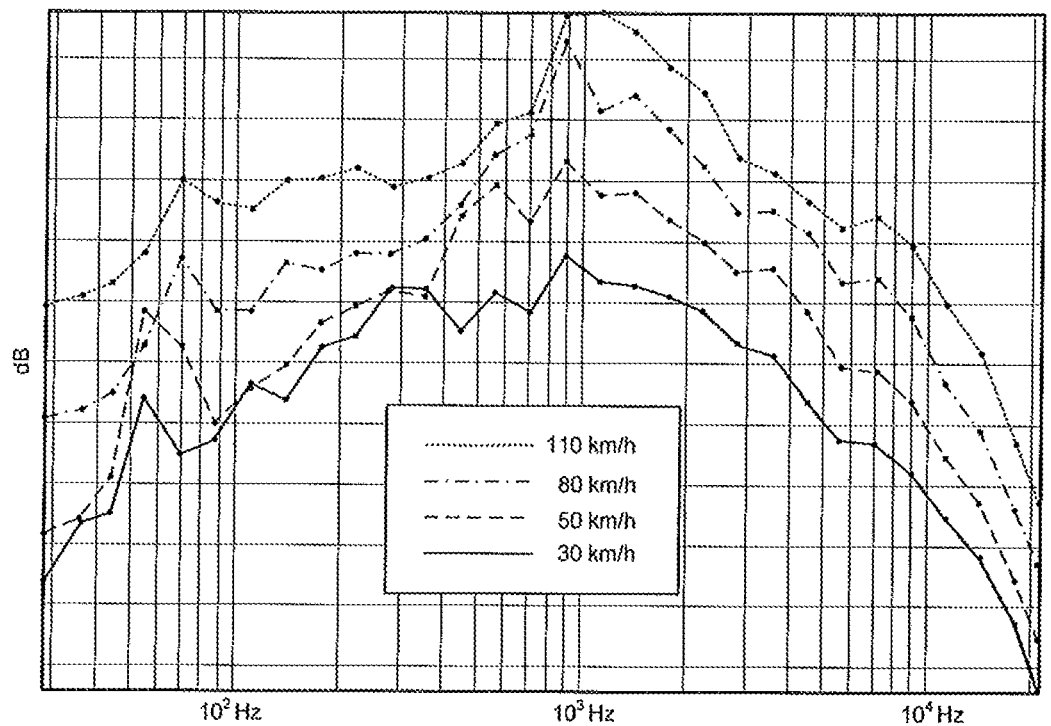
FIG. 2 shows a non-"normalized" sound power spectrum for measurements performed at different speeds.

FIG. 2 is a spectral representation of the sound power recorded by the microphone during a time frame. Here, "time frame" is understood to mean the interval of time, which is generally short, during which is made a recording used as the basis for establishing the data on which a measurement is based. This time frame is less than or equal to 0.5 seconds or, ideally, less than or equal to 0.25 seconds.

This spectral representation represents the received sound power (in dB) as a function of frequency over a given frequency interval, which is typically, here, the audible frequency interval between 0 Hz and 20 KHz.

More specifically, the spectral representation of FIG. 2 is obtained by breaking down the frequency interval into frequency bands of predetermined widths and by assigning to each frequency band a characteristic value equal to the mean power measured in this frequency band. Splitting of the frequency interval into one-third octave bands seems to be the most appropriate. Thus, each point of each of the curves of FIG. 2 represents a mean sound power for a given frequency band measured during a time frame under running conditions in which, all things otherwise being equal, only speed is varied (typically from 30 kmh to 110 kmh).

It is thus observed that the curves representing the spectral powers are offset relative to one another and that the total sound power dissipated increases as a function of speed. However, the general form of the curves remains similar.

This observation is reproduced when one or more modalities of the other classes are changed and the curves obtained are compared while varying only the speed parameter.

The total sound power over the entire frequency interval, which may be likened to the area between the curve and the abscissa axis, is then determined, and, for each frequency band, the mean power observed in this frequency band during a given time frame is divided by the total power recorded during this time frame over the entire frequency interval. To an extent, this equates to "normalizing" the measurement.

Figure 3:
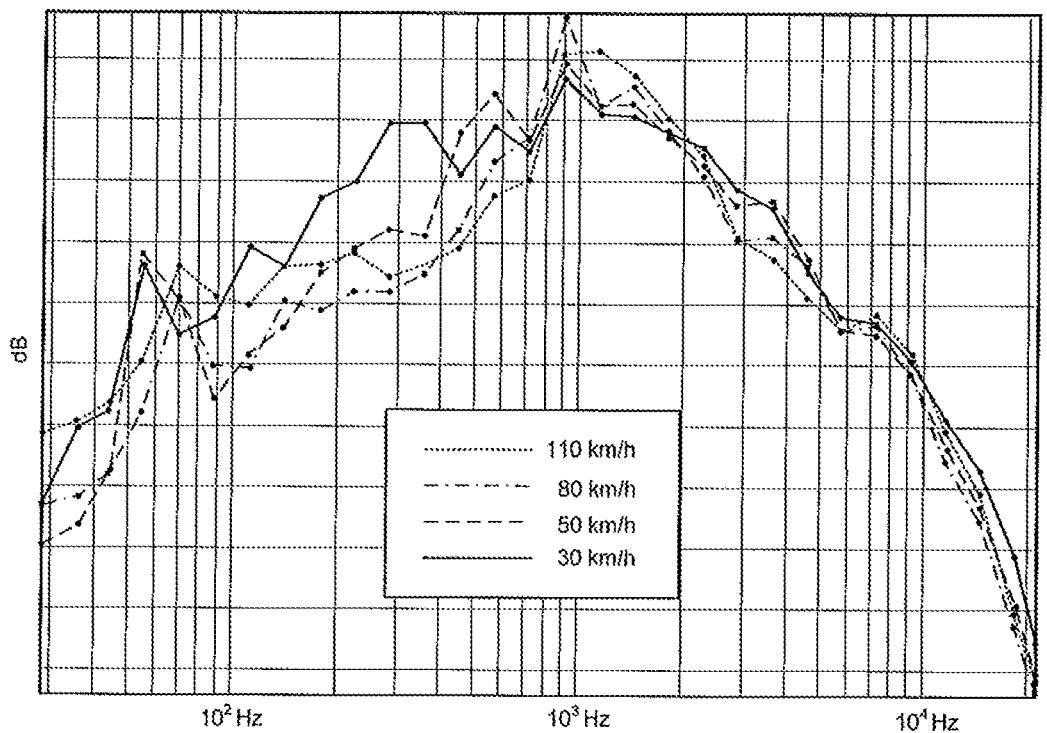
FIG. 3 shows the same power spectrum after "normalization".

It will thus be observed in FIG. 3 that the curves obtained previously substantially overlap and have very similar profiles, in particular in the highest frequency bands most representative of the sound phenomena described above.

This "normalization" makes it possible to neutralize the speed-linked effect without thereby substantially modifying the analysis capacity that it is possible to produce from a sound recording during a given time frame.

This advantage may prove to be decisive when there is no desire to link the computer 2 to means for assessing the speed of the vehicle and it is desired to obtain information on the condition of the road or of the vehicle autonomously.

For the sake of simplification and speed in the execution of the calculations, total power may be deemed to be equal to the sum of the mean powers in each of the frequency bands of the frequency interval in question.

Each of the points of the curve in FIG. 3 is a value representative of the mean sound power in a given frequency band. All these points may thus constitute a vector in a vector space comprising as many dimensions as frequency bands. In the example serving as support for the present description, a vector comprising 21 dimensions is obtained by considering a frequency interval segmented into one-third octaves and included in the frequency interval located between 200 Hz and 20 KHz. It will be observed in passing that the sum of the values forming the coordinates of a vector is equal to 1.

The choice of frequency interval may also be adapted according to whether it is desired to completely eliminate the noise generated by the engine, the maximum amplitude of which is between 50 Hz and 60 Hz, in which case a frequency interval in the range, for example, between 200 Hz and 20 KHz will be considered, or whether it is desired to keep the relevant information portion contained in the frequency range below 200 Hz, in which case account will be taken of the spectrum over the entire interval between 0 Hz and 20 KHz.

The sound power during a time frame may be recorded from a high-frequency sampling (around 40 kHz) of the sound signal.

The implementation of the invention comprises a preliminary learning phase, during which a large number of measurements are made by varying, in a known manner, the modalities described above, and describing the weather conditions, the condition of the road, the condition of wear or the type of tread pattern of the tyre. Each of these measurements is assigned a vector obtained under the conditions described above. This constitutes a vehicle-specific learning base.

The statistical analysis and processing methods for the data are known per se and are not a subject of the present invention. The linear discriminant analysis method used made it possible to obtain reliable, robust results.

A first step in this method consists in determining the principal factorial axes that make it possible to reduce the number of dimensions to the precise number required to describe the vectors assigned to each of the measurements along the orthogonal axes. The passage of the vector space, of which the number of dimensions is equal to the number of frequency bands, typically equal to 21 dimensions, in the discriminant space is achieved with the aid of a linear transformation.

A second step then consists, with the aid of discriminant analysis proper, in seeking, in this reduced discriminant space, the zones in which the measurements obtained during the learning phase according to a given single modality or according to a combination of modalities are located.

Here, "combination of modalities" is understood to mean a state representing a given measurement made according to a modality chosen in each of the classes. By way of example, a measurement performed under "wet" conditions, on a "closed" road with a "summer", "worn" tyre represents the "wet-closed-summer-worn" modality combination. The number of combined modalities is thus equal to the product of the number of modalities of each of the classes.

Next, in this reduced discriminant space, the centre of gravity of the zone in which the points representing a modality or a combination of modalities are located is calculated, as well as a confidence interval representing the dispersion of the points in one and the same zone relative to this centre of gravity.

In the example serving as support for the present description, the reduction in the number of dimensions between the starting discriminant space and the reduced discriminant space makes it possible to change from 21 dimensions to approximately 15 dimensions. This small reduction makes it possible to observe that it is the taking into account of the total form of the spectrum that is characteristic of the expression of the different modalities. And to suggest that the taking into account of the powers of a reduced number of frequency bands does not make it possible to highlight a particular modality pertaining to the road or the tyre, with the exception of the modalities linked to the weather condition of the road.

Figure 4:
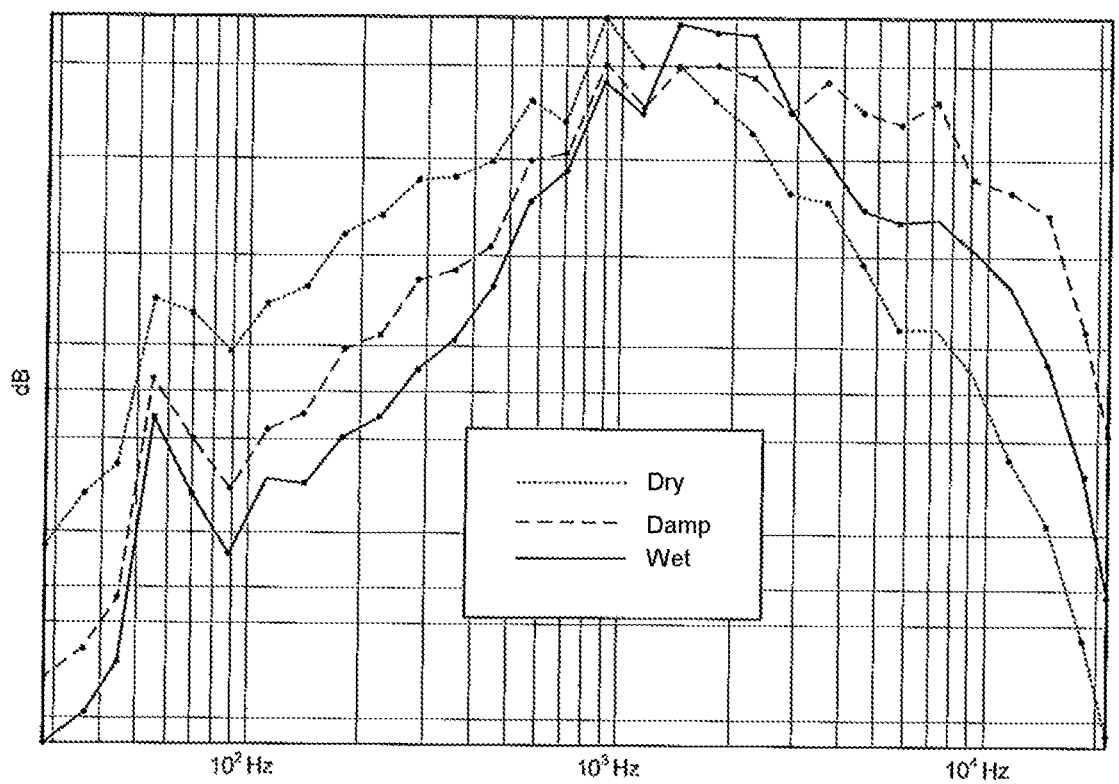
FIG. 4 shows the normalized mean power spectra for different weather conditions of the road.

FIG. 4 shows the spectral distribution of the "normalized" sound power in one-third octave frequency bands for three weather conditions of the road, all the modalities of the other classes otherwise being equal.

Figure 5:
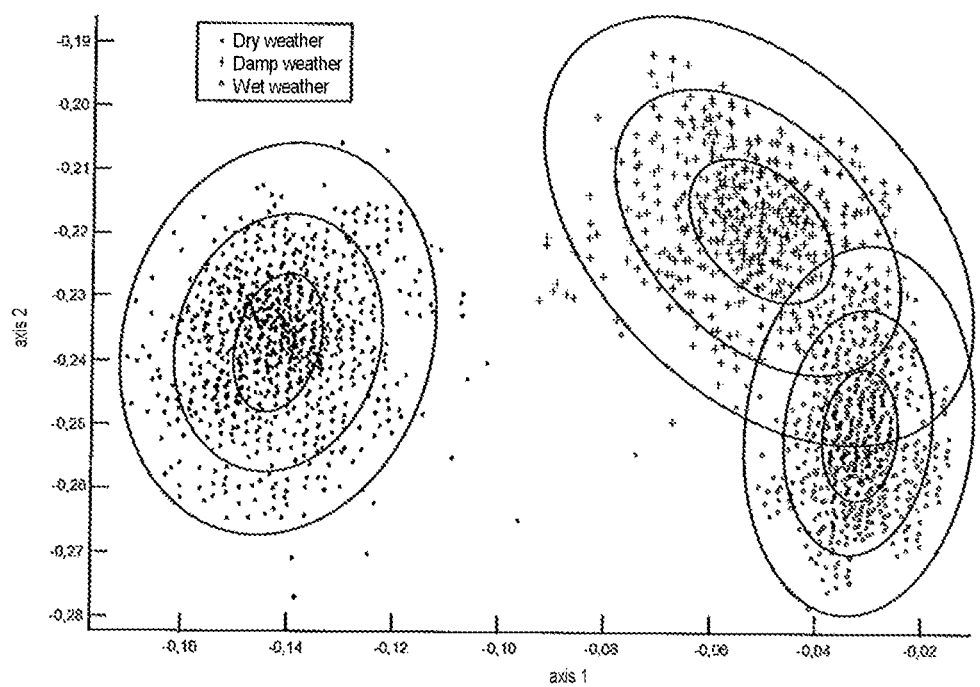
FIG. 5 shows a distribution of the measurements in a discriminant space reduced to two dimensions, as a function of the weather condition of the road.

FIG. 5 makes it possible to view, in a two-dimensional space, the distribution of the measurements according to one of the "dry", "damp", "wet" modalities of the "weather"

class for the road, in the case where it is the weather parameter that it is desired to determine.

A first observation makes it possible to note that the measurements performed on a dry ground surface do not overlap with the measurements made on a damp or wet ground surface. A second observation allows the conclusion that it is possible to determine the meteorological condition of the road independently of the modalities of the other classes with satisfactory robustness.

The ellipses surrounding each of the point clouds are placed at one, two and three standard deviations and make it possible to evaluate the dispersion of the measurements about the centre of gravity and above all to estimate the rate of recovery of a zone relative to another that is representative of the risk of incorrectly assigning to another modality a measurement performed according to a different given modality.

On the basis of these data, it is also possible to determine the probability of a new measurement belonging to one of the three modalities of the "weather" class for the road by evaluating the distance from this point to the centre of gravity of each of these modalities.

Table 1 gives the probabilities of classification of the weather condition of the road according to one of the three "dry", "damp", "wet" modalities.

TABLE 1

| Pj/i | J = dry | j = damp | J = wet |
|---|---|---|---|
| i = dry | 1 | 0 | 0 |
| i = damp | 0 | 0.91 | 0.09 |
| i = wet | 0 | 0.03 | 0.97 |

As will be seen, probabilities sufficiently high to conclude that the vehicle is traveling on a "dry", "damp" or "wet" road are obtained. In addition, only the recognition of the "damp" modality can be wrongly assigned to the "wet" modality in 9% of cases.

Similarly, it would be possible to determine the condition of the surface of the road with less robustness than the weather condition for the road, without it being necessary to be aware in advance of the condition of the tyre. However, it will be preferable to perform this analysis when the road is dry. This observation suggests that certain acoustic phenomena linked to the porosity and the reflection of the ground surface are independent of the nature of the tyre.

Conversely, by carrying out similar analyses, it is observed that the zones covering the vectors relating to the modalities linked to the condition of the tyre (wear or tread pattern) are relatively dispersed and highly interpenetrated relative to one another (strong dispersion about the centre of gravity and short distance from the centres of gravity), which does not make it possible to conclude in favour of a precise modality without a high risk of incorrect determination, in particular when the condition of the road is "damp" or "wet".

For greater robustness, it thus appears to be preferable to carry out the discriminant analysis on the basis of the combined modalities of the three classes. The point clouds representing the vectors and the measurements made according to a given combination of modalities chosen from each of the three "condition of the road surface", "wear", "tread pattern" modality classes are located in the reduced discriminant space.

The modalities linked to the tread pattern of the tyre are denoted "A" in the case of a "winter" tyre and "P" for a "summer" tyre, the modalities of the condition of wear are denoted "N" for a "new" tyre, "M" for a "semi-worn" tyre and "U" for a "used" tyre and, lastly, the modalities of the condition of the road surface are denoted "f" for the "closed" modality, "m" for the "medium" modality and "o" for the "open" modality. The 18 combined modalities are then denoted, respectively: ANf, ANm, ANo, AMf, AMm, AMo, AUf, AUm, AUo, PNf, PNm, PNo, PMf, PMm, PMo, PUf, PUm, PUo.

Table 2 gives the probabilities obtained from the results of measurements contained in the learning base for each of the 18 modality combinations. The dispersion of the measurements, observed for the modalities alone, is thus much weaker for the combined modalities and makes it possible to proceed to a classification in a more efficient manner.

TABLE 2

| | ANf | ANm | ANo | AMf | AMm | AMo | AUf | AUm | AUo | PNf | PNm | PNo | PMf | PMm | PMo | PUf | PUm | PUo |
|---|---|---|---|---|---|---|---|---|---|---|---|---|---|---|---|---|---|---|
| ANf | 0.9 | 0.02 | | 0.03 | | | 0 | | | | | | | | | | | |
| ANm | | 0.99 | | | 0.01 | | | | | | | | | | | | | |
| ANo | | | 0.96 | | | | | | | | | 0 | | | | | | |
| AMf | | | | 0.95 | | | 0 | | 0 | | | | | | | | | |
| AMm | | 0.01 | | | 0.95 | | | 0.01 | | | | | | 0.01 | | | 0.03 | |
| AMo | | 0.03 | | | | 0.96 | | | | | | | | | | | | |
| AUf | | | | | | | 1 | | | | | | | | | | | |
| AUm | | | | | 0.01 | | | 0.97 | | | | | | 0.01 | | | 0.01 | |
| AUo | | | | | | | | | 0.91 | | | | | | | | | 0.1 |
| PNf | | | | | | | 0 | | | 1 | | | | | | 0 | | |
| PNm | | 0.01 | | | | | | | | | 0.97 | | | 0.02 | | | | |
| PNo | | | | | | | | | | | | 1 | | | | | | |
| PMf | | | | | | | | | | | | | 1 | | | 0 | | |
| PMm | | 0.01 | | | 0.02 | | | | | | 0.01 | | | 0.96 | | | | |
| PMo | | | | | | | | | | | | | | | 1 | | | |
| PUf | | | | | | | | | | | | | 0 | | | 1 | | |
| PUm | | | | | | | | 0.06 | | | | | | 0.03 | | | 0.91 | |
| PUo | | | | | | 0.03 | | | 0.1 | | | | | | | | | 0.9 |

The global probability of detecting one of the modality combinations is of the order of 0.96.

The next step consists, for a given new measurement, in recognizing the modality of each of the "condition of the road surface", "wear" and "tread pattern" classes in which the measurement was performed.

Table 3 makes it possible to determine the probabilities of detecting the modality of one of the 3 classes as a function of the modality combinations.

This Table 3 indicates that, if a measurement is assigned to the "Auf" (winter, worn, closed road surface) class, there may be a good level of confidence in the determination of the tread pattern (1), of the condition of wear (U) and of the condition of the road surface (1). Relatively poorer confidence is obtained in the "AUo" (winter, worn, open) class for which the predication as to the type of tyre tread pattern is poorer (0.91).

TABLE 3

| Class identified | Probability of detecting the class | | |
|---|---|---|---|
| | Tread pattern | Wear | Road surface |
| ANf | 1 | 0.95 | 0.98 |
| ANm | 1 | 0.99 | 1 |
| ANo | 0.96 | 1 | 1 |
| AMf | 0.98 | 0.95 | 1 |
| AMm | 0.97 | 0.96 | 1 |
| AMo | 0.99 | 0.96 | 0.99 |
| AUf | 1 | 1 | 1 |
| AUm | 0.98 | 0.98 | 1 |
| AUo | 0.91 | 1 | 1 |
| PNf | 0.98 | 0.95 | 1 |
| PNm | 0.99 | 0.98 | 1 |
| PNo | 1 | 1 | 1 |
| PMf | 1 | 0.97 | 1 |
| PMm | 0.97 | 0.98 | 1 |
| PMo | 1 | 1 | 1 |
| PUf | 1 | 0.97 | 1 |
| PUm | 0.94 | 0.97 | 1 |
| PUo | 0.87 | 0.97 | 1 |

Using the learning base, the zones in which the combined modalities are situated in the reduced discriminant space, and also their centre of gravity and their dispersion, are located. Typically, in the case of the present description, the 18 zones of the 18 combined modalities in question are located in the reduced discriminant space.

Next, using the location of the vector associated with each new measurement and transformed in the reduced vector space, for each of the modalities of a class, a probability for each of the modality combinations containing this modality is determined and this measurement is assigned the modality of the class having the strongest probability.

Thus, if the weather class identified is "dry", the 21 variables of the vector resulting from the measurement make it possible, relying on the discriminant analysis based on the learning base, to determine a probability of belonging to one of the combined modalities, according to the "condition of the road surface" class, the "wear" class or the "tread pattern" class, i.e., typically, in the case serving as support for the present description, the probability of belonging to one of the 18 combined modality classes: ANf, ANm, ANo, AMf, AMm, AMo, AUf, AUm, AUo, PNf, PNm, PNo, PMf, PMm, PMo, PUf, PUm, PUo. This probability is calculated, for example, by assessing a distance relative to the centre of gravity of the combined modality class in question.

The probability of the measurement belonging to one of the modalities of a particular class, other than the weather class, is then identified with the aid of a second probability calculation called the "tread pattern+wear+road surface on a dry ground surface" model, as follows.

The probability of the "closed" road surface condition modality is deduced from the relation $p$(road surface="closed")=$p$("closed")=$p$(ANf)+$p$(AMf)+$p$(AUf)+$p$(PNf)+$p$(PMf)+$p$(PUf)

Similarly, the following is deduced:

$p$(road surface="medium")=$p$("medium")=$p$(ANm)+$p$(AMm)+$p$(AUm)+$p$(PNm)+$p$(PMm)+$p$(PUm), and $p$(road surface="open")=$p$("open")=$p$(ANo)+$p$(AMo)+$p$(AUo)+$p$(PNo)+$p$(PMo)+$p$(PUo).

Which of the three probabilities that is maximum and that gives the modality of the condition of the detected road surface and the associated probability is now sought:

$p$(road surface)=max [$p$("closed"), $p$("medium"), $p$("open")].

Similarly, p(tread pattern=max [p("winter"), p("summer")] with:

$p$(tread pattern="winter")=$p$("winter")=$p$(ANf)+$p$(ANm)+$p$(ANo)+$p$(AMf)+$p$(AMm)+$p$(AMo)+$p$(AUf)+$p$(AUm)+$p$(AUo) and $p$(tread pattern="summer")=$p$("summer")=$p$(PNf)+$p$(PNm)+$p$(PNo)+$p$(PMf)+$p$(PMm)+$p$(PMo)+$p$(PUf)+$p$(PUm)+$p$(PUo).

Lastly, wear is given by p(wear=max [p("new"), p("semi-worn"), p("worn")] with:

$p$(wear="new")=$p$("new")=$p$(ANf)+$p$(ANm)+$p$(ANo)+$p$(PNf)+$p$(PNm)+$p$(PNo), $p$(wear="semi-worn")=$p$(semi-worn")=$p$(AMf)+$p$(AMm)+$p$(AMo)+$p$(PMf)+$p$(PMm)+$p$(PMo) and, $p$(wear="worn")=$p$("worn")=$p$(AUf)+$p$(AUm)+$p$(AUo)+$p$(PUf)+$p$(PUm)+$p$(PUo).

The probability of assignment to a modality resulting from a given measurement is then compared with a specific threshold in order to decide as to the validity of the result identified and its transmission to a display or driving assistance system. By way of example, all the detections of which the classification probability is not at least equal to 0.75 are rejected. In addition, if this probability is between 0.95 and 0.75, the result arising from the measurement must be confirmed by one or more subsequent measurements.

It will be observed, here, unlike the weather condition or the condition of the surface of the road, which may evolve abruptly and which require rapid decision-making, that the evolution of wear or the type of tread pattern of the tyre are factors that are much more stable over time, typically over time scales corresponding to travelled distances of 100 kilometres or even 1000 kilometres. However, as the detection of these tyre parameters is dependent on the condition of the road, the paradox arises whereby it must be possible to detect them practically as rapidly as the condition of the road is detected.

The probability of an incorrect determination on these two criteria can be greatly reduced by combining the observations obtained using a plurality of consecutive measurements before deciding as to the actual condition of wear or the type of tyre tread pattern mounted on the vehicle.

Figure 6:
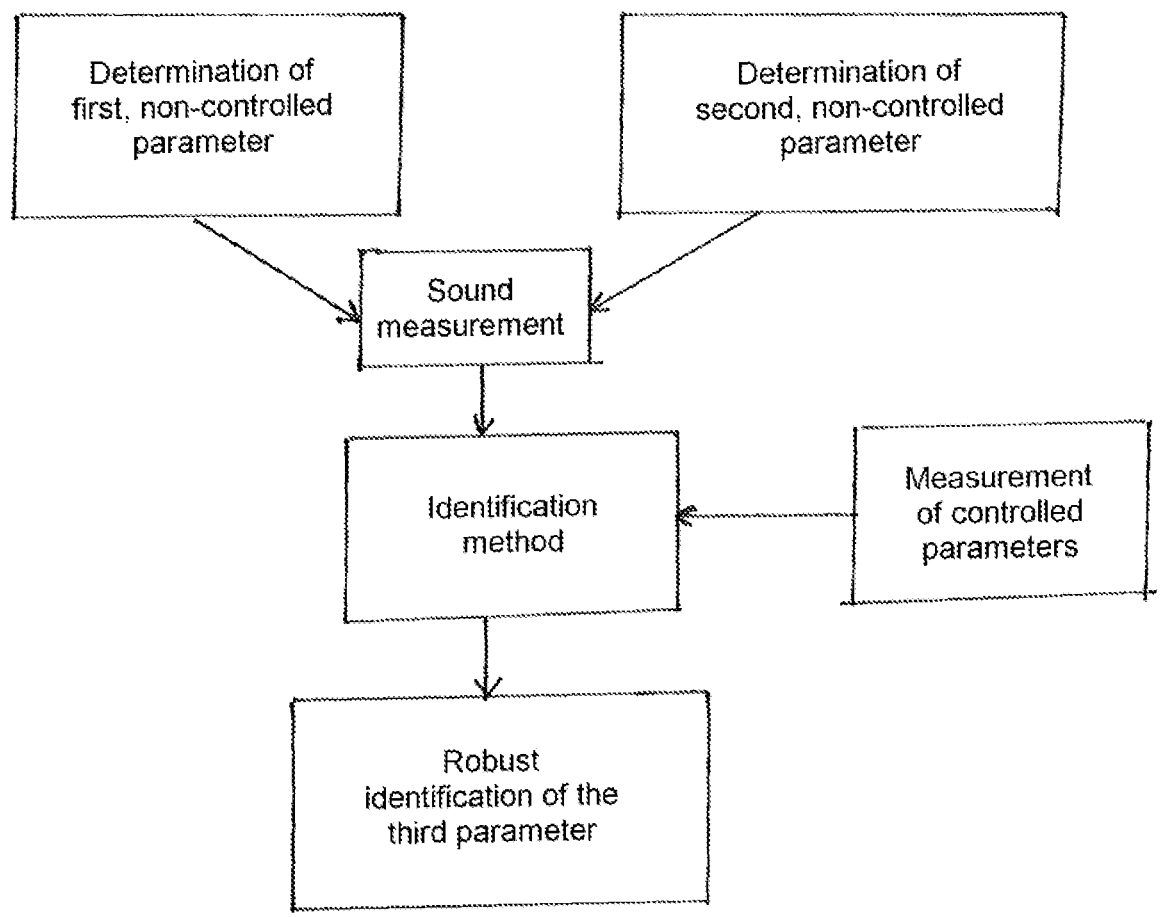
FIG. 6 shows a functional diagram of the steps in implementing the method according to the invention.

FIG. 6 gives the sequence of operations implemented in the method according to the invention. This figure shows the determination of a non-controlled running parameter taken from the following parameters: wear of the tyre, condition of the road surface, weather condition, knowledge an estimation of the other two, non-controlled running parameters.

This method thus comprises the following preparatory steps:
- a step of measuring the sound emitted by the contact between the tyre and the ground surface, this measurement being performed by a microphone installed on the tyre,
- a step of determining the two known non-controlled parameters. This determination is performed by implementing one or more of the means described above,
- a step of measuring the controlled running parameters (speed of the vehicle, pressure of the tyres, load carried).

It is specified, here, that it is possible, in another exemplary embodiment, to dispense with the step of determining the second, non-controlled parameter appearing in the figure. In this case, the second parameter is determined using means such as those described above.

The data resulting from these different preparatory steps are then input to an identification method chosen from the examples cited above. The application of such a method thus makes it possible directly to carry out robust identification of the parameter to be determined.

The embodiments of the invention serving as the basis for the present description are not limiting and may be the subject of variant embodiments, in particular in terms of the choice of the methods for digital analysis of the data, in so far as they make it possible to obtain the technical effects as described and claimed.

The invention claimed is:

1. A method for measuring a running parameter of a vehicle traveling on a road using a discriminant analysis, the vehicle having a tire and a computing device, the method comprising the steps of:
   moving the vehicle to generate noise from the tire;
   recording a measurement of a sound signal produced by the tire traveling on a surface of the road during a time interval, the sound signal generated by the tire being measured using a microphone mounted on the vehicle;
   computing, using the computing device connected to the microphone, a spectral power density of the sound signal over a frequency interval;
   segmenting, using the computing device, the frequency interval into a plurality of frequency bands of predetermined widths and associating with each frequency band a data item representing a mean sound power of the measurement in each frequency band;
   obtaining, using the computing device, a measured vector associated with the measurement based on the data items representing the mean sound power of the measurement in each frequency band;
   obtaining, using the computing device, a condition of the road and a condition of the tire corresponding to the measured vector, using an identification method based on a learning basis, the learning basis being formed by a set of vectors associated with a plurality of measurements of sound signals produced by the tire or other tires previously recorded and performed, in accordance with the same steps as above, under known running conditions as a function of modalities, each modality representing a running condition,
   wherein the identification method identifies current road and tire condition data and comprises the following steps:
   using the learning basis to locate zones formed by each modality or one or more combinations of the modalities in a reduced discriminant space, and
   transforming the measured vector in the reduced discriminant space to a reduced measured vector to identify the current road and tire condition data; and
   preventing, when determining the condition of the tire, incorrect determinations resulting from modalities relatively dispersed and highly interpenetrated relative to one another by configuring the discriminant analysis to be carried out based on three combined modalities, each selected from a different class of the following three classes: (i) a road surface condition class, (ii) a wear class, and (iii) a tread pattern class.

2. The method according to claim 1, wherein a total sound power measured is equal to a sum of the mean sound power of all of the frequency bands of each frequency interval.

3. The method according to claim 1, wherein the frequency bands are determined by breaking down the frequency interval into one-third octave bands.

4. The method according to claim 1, wherein the time interval of a measurement is less than or equal to 0.5 seconds.

5. The method according to claim 1, wherein the time interval of a measurement is less than or equal to 0.25 seconds.

6. The method according to claim 1, wherein the frequency interval is between 0 Hz and 20 KHz.

7. The method according to claim 1, wherein the frequency interval is between 200 Hz and 20 KHz.

8. The method according to claim 1, wherein a weather class of modalities, formed by different weather conditions for the road, comprises a dry condition, a damp condition, and a wet condition.

9. The method according to claim 1, wherein the road surface condition class of modalities, formed by different road surface conditions for the road, comprises a closed condition, a medium condition, and an open condition.

10. The method according to claim 1, wherein the wear class of modalities, formed by different tire wear conditions, comprises a new condition, a semi-worn condition and a worn condition.

11. The method according to claim 1, wherein the tread pattern class of modalities, formed by different types of tire tread pattern, comprises a tread pattern of summer type and a tread pattern of winter type.

12. The method according to claim 1, wherein the discriminant analysis comprises associating a probability according to each of the modalities or the one or more combinations of the modalities with the reduced measured vector as a function of the location of the reduced measured vector; and determining a most probable modality according to each modalities.

13. The method according to claim 12, wherein a modality in accordance with a road surface condition, wear or tread pattern is associated with the measurement after having previously determined that the measurement was performed on a dry road.

14. The method according to claim 13, wherein, for each of the modalities of a class, a probability according to each of the one or more combinations of the modalities containing this modality is associated with the measurement, and the modality of the class having a greatest probability is attributed to the measurement.

15. The method according to claim 14, wherein a diagnosis of a condition of the tire is performed in accordance with a wear modality or a tread pattern modality by combining results of the measurements performed at different time intervals.

16. The method according to claim 1, wherein the microphone is mounted on the vehicle in a front part of a wheel arch located at a rear of the vehicle.

* * * * *